United States Patent
Roll et al.

(10) Patent No.: US 6,270,660 B1
(45) Date of Patent: *Aug. 7, 2001

(54) FLOW INVERTER FOR FILTERS

(75) Inventors: Mark A. Roll, Bessemer City; Willie L. Stamey, Jr., Kings Mt., both of NC (US)

(73) Assignee: Dana Corporation, Toledo, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/030,086

(22) Filed: Feb. 25, 1998

Related U.S. Application Data

(63) Continuation-in-part of application No. 08/685,948, filed on Jul. 22, 1996, now Pat. No. 5,830,349.

(51) Int. Cl.[7] .................................................. B01D 27/10
(52) U.S. Cl. ......................... 210/131; 210/443; 210/455; 210/456; 210/DIG. 17; 137/549; 137/599.1
(58) Field of Search .................................. 210/130, 131, 210/303, 308, 309, 312, 313, 429, 440, 443, 444, 450, 453, 455, 456, DIG. 5, DIG. 17; 137/547, 549, 599.1; 277/918

(56) References Cited

U.S. PATENT DOCUMENTS

| 4,253,954 | * | 3/1981 | Midkiff et al. ............... 210/DIG. 5 |
| 4,292,179 | * | 9/1981 | Stone et al. ....................... 210/443 |
| 5,830,349 | * | 11/1998 | Roll et al. ....................... 210/231 |

FOREIGN PATENT DOCUMENTS

| 1444083 | * | 7/1976 | (GB) ................................. 210/130 |
| 1526501 | * | 9/1978 | (GB) ................................. 210/450 |

* cited by examiner

Primary Examiner—Matthew O. Savage
(74) Attorney, Agent, or Firm—Millen, White, Zelano & Branigan, P.C.

(57) ABSTRACT

A flow inverter element is configured as an insert having both axial passages and radial passages, which passages are physically isolated from one another. The axial passages communicate with an annular chamber which opens to a series of inlet ports in the end plate of the housing while the radially extending passages communicate with a cylindrical chamber aligned with central output port in the end of the housing. The flow inverter is perferably molded of nitrile rubber and directly seals with a filter element, as well as with the end of a housing.

11 Claims, 3 Drawing Sheets

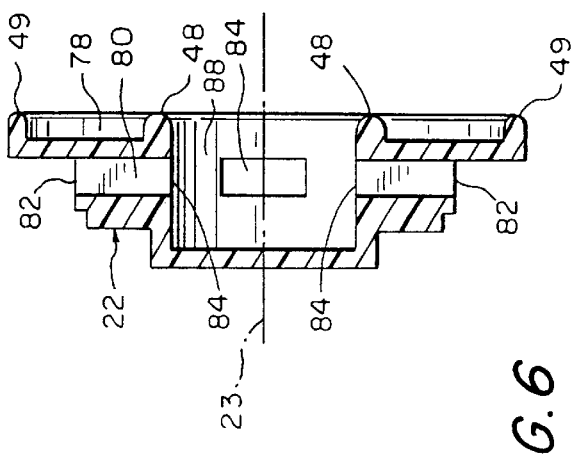
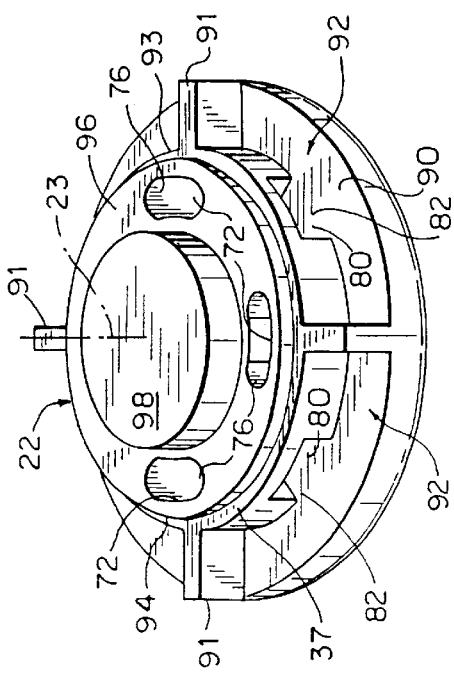
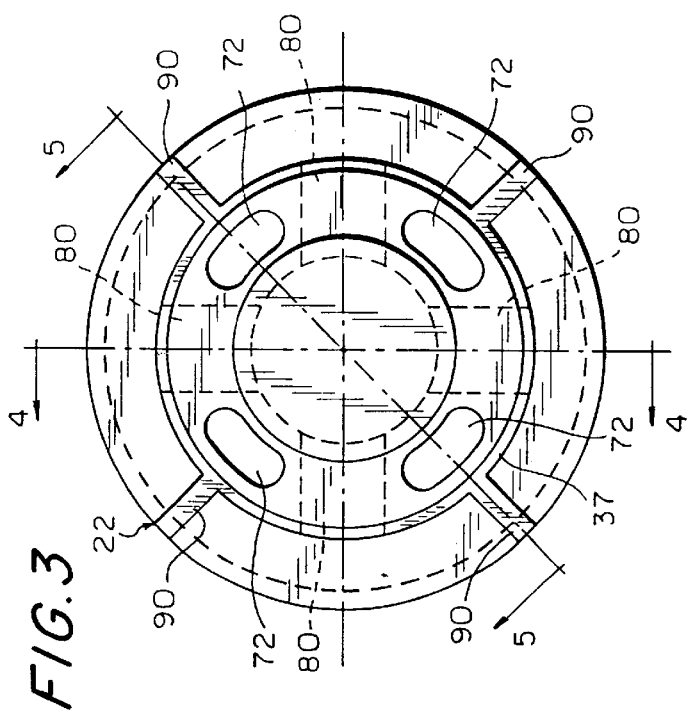
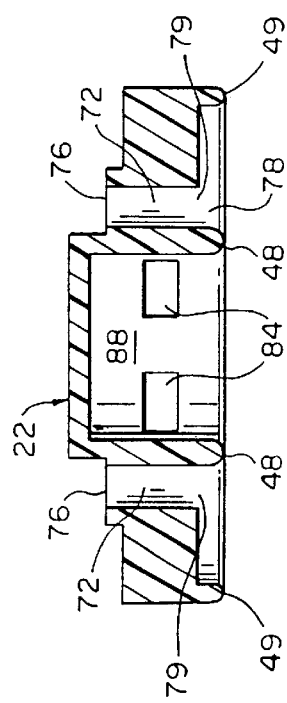

FLOW INVERTER FOR FILTERS

CROSS-REFERENCE TO RELATED APPLICATIONS

This application is a continuation-in-part of application Ser. No. 08/685,948, filed Jul. 22, 1996, U.S. Pat. No. 5,830,349.

FIELD OF THE INVENTION

The present invention is directed to flow inverters for filters. More particularly, the present invention is directed to flow inverters for filters which filter liquids.

BACKGROUND OF THE INVENTION

For some automotive applications, flow-through filter cartridges have been changed so that inlet fluid now flows through radially positioned, spaced inlet ports in the filter cartridge through the inside surface of an annular filter media and out through a centrally disposed, outlet port. The centrally disposed, outlet port is threaded so that these filter cartridge configurations are in many essential ways similar to standard spin-on filter cartridges.

In most prior art spin-on filter cartridges, fuel, lubricating oil or other liquids to be filtered flow radially disposed, spaced apart ports, through a filter media from the outside and exits the filter cartridge through a central port. Production lines have been operating for many years producing these type of spin-on filters.

In order to reduce the number of ports inside of filter cartridge and to take advantage of coalescing filter media in which flow must be from the inside out, it is necessary to reconfigure filter cartridges. To the extent that existing production facilities can continue to be used with as little disruption as possible, the expense of accommodating the new arrangement in which flow of the fluid to be filtered is reversed should be minimized. One way to minimize expense is to use as many conventional components as possible so as to avoid the delay and expense of redesigning components, retooling production machinery and retraining employees. In reconfiguring filter cartridges, it is also preferable to reduce the number of component parts and reduce line labor required for assembly.

SUMMARY OF THE INVENTION

It is a feature of the present invention to provide new and improved arrangements for reversing flow in filters, such as spin-on filters, wherein flow reversal is accomplished effectively and at minimal expense.

In accordance with the present invention, flow reversal from outside-in to inside-out in spin-on type filter cartridges is accomplished by capturing inlet fluid from a plurality of radially disposed inlet ports, directing fluid in through the inside surface of a filter media, out through the outside surface of the media and discharging the fluid to a central outlet port. For this purpose, a flow reversal element is utilized, the flow reversal element having axial passages and radial passages which are isolated from one another. The axial passages communicate with the radially disposed ports on the dirty side of the filter media and the radial passages communicate with the central port on the clean side of the filter media.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 3 is a top view of a flow inverting element used with the first embodiment of the invention shown in FIGS. 1 and 2;

FIG. 4 is a side elevation taken along lines 4—4 of FIG. 3;

FIG. 5 is a side elevation taken along lines 5—5 of FIG. 3;

FIG. 6 is a perspective view of the element of FIGS. 3, 4 and 5; and

DETAILED DESCRIPTION

Figure 1:
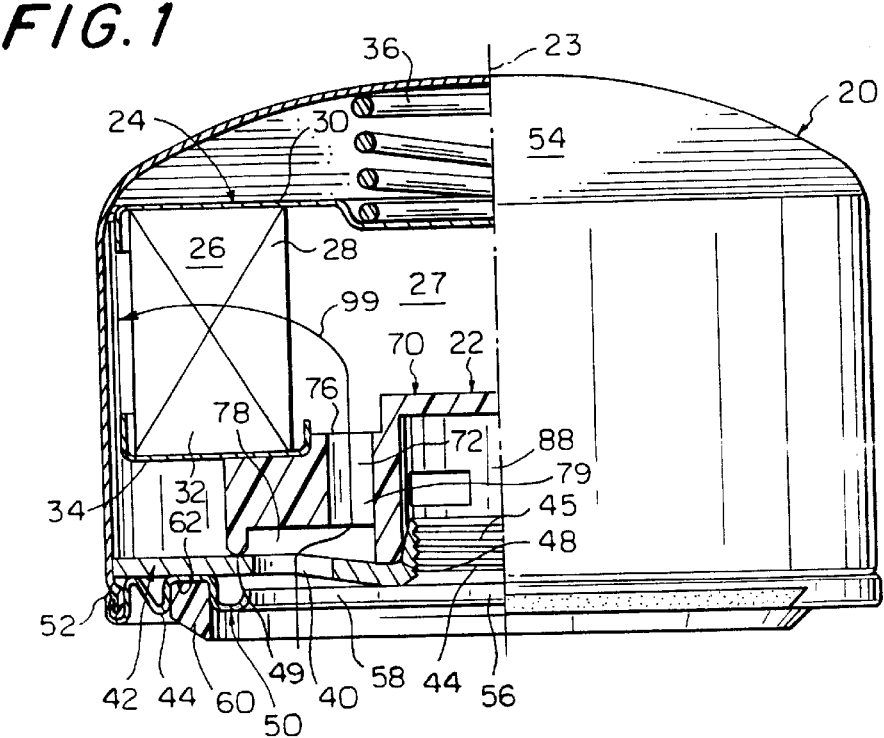
FIG. 1 is a side view, partially in elevation, showing an oil filter cartridge configured in accordance with the principles of the present invention and illustrating the flow of liquid into the cartridges.
Figure 2:
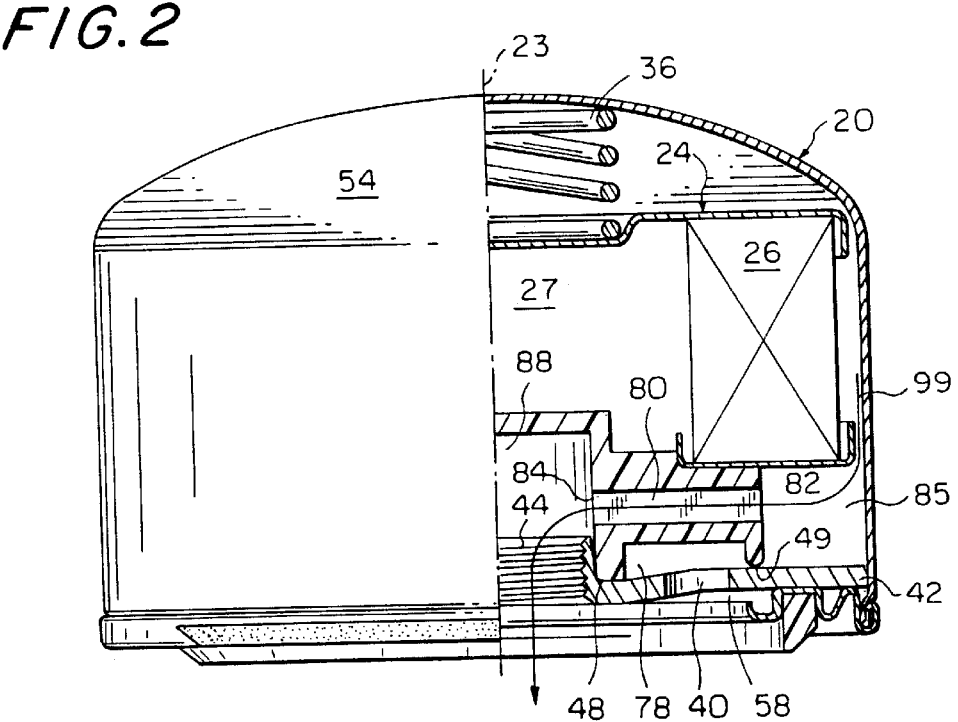
FIG. 2 is a side view of the filter cartridge of FIG. 1 taken at a different elevation, showing lubricating oil exiting from the filter cartridge.

There is shown in FIGS. 1 and 2 a filter cartridge assembly 20 which includes therein a flow inverting element 22 illustrated in isolation in FIGS. 3–6. Both the filter cartridge 20 and flow inverting element 22 are coaxial with an axis 23. The flow inverting element 22 is an insert made of a molded plastic material which is elastic and this seals with the components it engages. The flow inserting element may be made of a nitrile rubber, such as Jasper MF4505 available from the Jasper Rubber Company of Jasper, Ind.

The filter cartridge 20 includes a filter element 24 therein, which filter element 24 includes a filter media 26. The filter media 26 is preferably configured of pleated filter paper. The filter media 26 has a hollow core 27 and is closed at a top end 28 by a first end cap 30 and at a bottom end 32 by a second end cap 34. A coil spring 36 urges the filter element 24 into abutment with the flow inverting element 22, which seals thereagainst via surface 37. The flow inverting element 22 overlies a plurality of radially disposed, spaced apart, ports 40 in an end plate 42. The end plate 42 also includes a center opening port 44 which port has an internal helical thread 45, is coaxial with the axis 23 and is aligned with the hollow core 27 of the filter element 24. The flow inverter 22 contacts the end plate 42 directly and seals thereagainst with annular surfaces 48 and 49.

The end plate 42 is welded to a sheet metal cover 50. The cover 50 is crimped by a peripheral crimp 52 to a housing 54 which encloses the components of the filter cartridge 20 and against which the coil spring 36 bears. Cover 50 includes a central opening 56 which is defined by a lip 58. The opening 56 is aligned with both the radially disposed port 40 and the central port 44. Proximate the opening 56 is an annular seal 60 of a deformable material. The annular seal 60 is seated within an annular groove 62 defined in the cover 50. When the cartridge 20 is mounted on an engine (not shown), an externally threaded standpipe (not shown) is threadably received in the opening 44 and retained by the threads 45 as the filter assembly 20 is rotated. Thus, filter cartridge assemblies such as the filter cartridge assembly 20 are known as "spin on filters". As the filter cartridge assembly 20 is tightened against the engine, the gasket 60 deforms to provide an outer seal. With the exception of the flow inverter element 22, the structures described thus far are substantially repeated in each embodiment of this invention, there being further modification of the filter element 24 with the filter media 26 changing axial dimension but otherwise remaining sub-stantially the same.

Referring now to the flow inverter element 22, it is seen that the flow inverter element 22 is a molded unitary component made of a single block 70. The single block 70 has four first passages or discrete channels 72 which have first and second discrete end openings 79 and 76, respectively. Each of the first end discrete openings 79 are aligned with an annular first chamber 78 while the second and discrete openings 76 communicate with the hollow core 27 of the filter element 24 and while a closed annular wall isolates the annular first chamber 78 from the space 85. The second passages or discrete channels 80 (best seen in FIGS. 2 and 4) extend radially with respect to the axis 23 and each have a third discrete opening 82 and a fourth discrete opening 84. The third discrete opening 82 opens within a space 85 in the housing while the fourth discrete opening 84 opens to a cylindrical chamber 88. The cylindrical chamber 88 is isolated with respect to the hollow core 27 and opens to the central port 44 so that the filtered lubricant in space 85 flows out through the central port of the filter cartridge assembly 20 to the engine. As is seen in FIG. 3, the second discrete passages 80 are disposed between and angularly spaced from the first discrete passages 72 so as to be isolated therefrom. The second discrete passages 80 are separated from one another by walls.

As is best seen in FIG. 6, the first and second passages or discrete channels 72 and 80 are formed in a stack of disks. A base disk 90 is separated into four sections by a plurality of ribs 91 to define spaces 92. The spaces 92 are aligned with the second passages 80 which extend inwardly from the spaces. The second passages 80 are formed in a disk 93 which has an upper surface 94 which is coextensive with the upper surfaces of the ribs 91. A third disk 96 extends from the second disk 93 and has the axial passages 72 extending therethrough into communication with the annular chamber 78 (see FIGS. 4 and 5). Projecting from the third disk 96 is a fourth disk 98 which forms a unitary cap on the cylindrical chamber 88 with which the second passages 80 communicate.

Referring again to FIGS. 1 and 2 in combination with FIGS. 5 and 6, it is seen that the top surfaces of the ribs 91 and the surface 93 provide support for the filter element 24. The spaces 92 provide for entry of the lubricating oil to be filtered into the second, radially extending passages 80.

As is seen in FIG. 1, lubricating oil enters the cartridge 20 through the radially disposed, spaced ports 40 and follows the path of arrows 99 through the first openings 79 of the first passages 72 and out of the second openings 76 into the hollow core 27. From the hollow core 27, the unfiltered oil passes through the filter media 26, and as is seen in FIG. 2, from the filter media 26, passes into the space 85. From the space 85, the filtered lubricating oil passes through the third openings 82, which are in the second passages 80, and out of the fourth opening 84 in the second passages. The lubricating oil then enters the cylindrical chamber 88 and exits through the central port 44.

Figure 7:
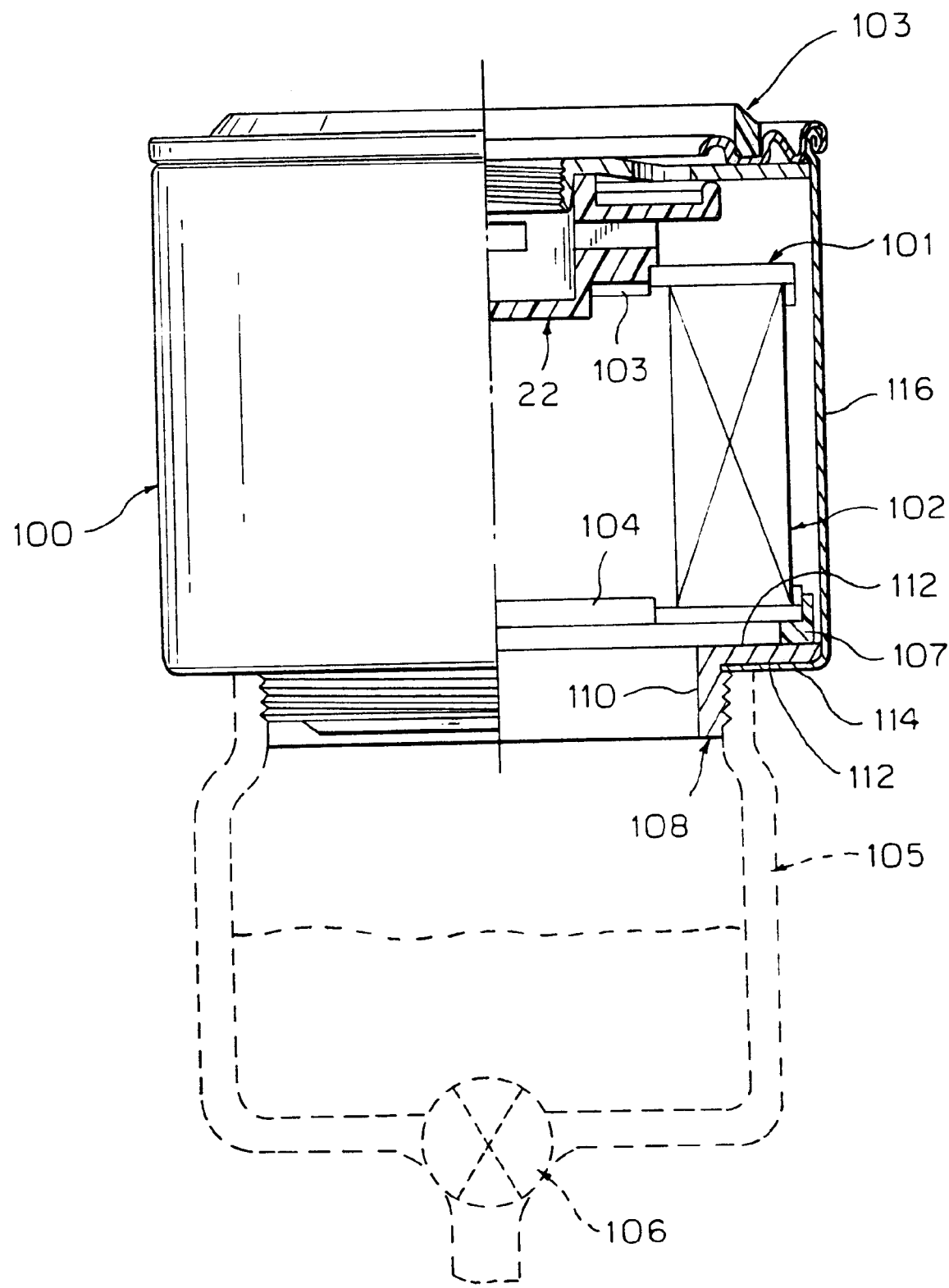
FIG. 7 is a side view, partly in elevation, showing a spin-on fuel filter configured in accordance with the present invention.

As is seen in FIG. 7, the flow inverter 22 is also usable as an insert with a fuel filter 100 to direct the flow of fuel through a fuel filter element 101 including the filter media 102. In FIG. 7, the flow is the same as in FIGS. 1 and 2. The fuel filter element 101 is open at both ends 103 and 104 so that the fuel with water mixed therein flows out of end 104 into a cast iron container 105 with a drain valve 106 therein. The filter media 102 is hydrophobic and allows passage of fuel but not of water so the water collects in the container 105 from which it is periodically drained by the valve 106. The fuel filter 100 uses a gasket 106 (instead of the coil spring 36) to urge the filter element 102 against the flow inverter 22 and has an end portion in the form of a plastic lid 108 engaged by the gasket 106. The lid 108 is comprised of an externally threaded mouth 110 and a radial flange 112. The radial flange 112 is seated against an inwardly projecting radial lip 114 which is unitary with the housing 116 of the fuel filter 100. Threaded on the externally threaded mouth 110 is the cast iron container 105 which collects the water separated from the fuel being filtered.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An insert adapted for use in a spin-on filter wherein the spin-on filter has a central axis and comprises an annular filter media coaxial with the axis disposed within a housing, said housing including an end plate defining a central outlet port coaxially aligned with said central axis and a plurality of inlet ports radially outwardly spaced from said central axis, the annular filter media having a hollow core aligned with said central outlet port and being axially spaced from the end plate to define a gap therebetween, wherein said insert is adapted to be located in said gap, the insert comprising:

a unitary block of elastic material;

a first side of the unitary block for facing said end plate, a second side of the unitary block opposite said first side for facing toward said filter media, said first side including a channel adapted to be positioned over said plurality of inlet ports, a blind outlet bore extending from said first side toward said second side and adapted to be positioned over said central outlet port, said insert having an outer peripheral surface extending between said first and second sides and an inner peripheral surface defined by said blind outlet bore, first discrete channels each having a first opening and a second opening, the first opening of each channel being located at said channel and being adapted to communicate with the radially positioned inlet ports and the second opening of each channel being located at said second side and being adapted to communicate with the hollow core of the filter media, wherein unfiltered fluid is adapted to enter the hollow core through the first channels from the radially disposed ports and from the hollow core is adapted to flow through the filter media into the gap between the filter media and housing, and second discrete channels in the unitary block isolated from the first channels and from one another by walls of said insert, the second channels each having a third discrete opening and a fourth discrete opening located at said outer peripheral surface and said inner peripheral surface of said insert, respectively, the third discrete opening of each second discrete channel being adapted to communicate with the gap between the filter media and housing and the fourth discrete opening of each second discrete channel being adapted to communicate with the central outlet port via said blind outlet bore, wherein filtered fluid in the gap passes through the second channel and out of the filter cartridge.

2. The insert of claim 1, wherein the elastic material is nitrile rubber.

3. The insert of claim 1 in combination with and disposed inside of a fuel filter housing.

4. The combination of claim 3, wherein the filter housing includes an end portion engaged directly by a gasket of resilient material.

5. The combination of claim 4, wherein the end portion of the housing is configured as a lid with a threaded mouth and a radial flange, the radial flange being engaged by the gasket.

6. The insert of claim 1, wherein the second side of the insert further includes a support surface adapted to support the annular filter media.

7. The insert of claim 1, wherein said annular channel defines a first chamber adapted for communication with the first openings of the first discrete channels and said blind outlet bore defines a second chamber adapted for communication with the fourth discrete opening of each second discrete channel, the first and second chambers being separated by a first wall and the first chamber being isolated from the space by a second wall.

8. The insert of claim 7, wherein the first chamber is annular and the second chamber is cylindrical with the second chamber being disposed radially inward of the first chamber and being separated therefrom by an annular wall.

9. The insert of claim 8, wherein the first discrete channels are adapted extend in the direction of the axis of the filter cartridge when the insert is mounted therein and the second discrete channels are adapted to extend in a radial direction with respect to the first channels.

10. The insert of claim 9, wherein a plurality of ribs extend radially with respect to each of the second openings in spaced relation thereto and are adapted to provide a support surface for the annular filter media.

11. The insert of claim 10, wherein the second discrete channels extend in the insert between the first discrete channels.

* * * * *